Patented Nov. 28, 1950

2,531,420

UNITED STATES PATENT OFFICE 2,531,420

CATALYTIC REDUCTION OF CARBON OXIDE BY HYDROGEN

Walter G. Frankenburg, Millersville, Pa., assignor to Hydrocarbon Research, Inc., New York, N. Y., a corporation of New Jersey No Drawing. Application April 30, 1947, Serial No. 745,117

4 Claims. (Cl. 260—449)

1

The present invention relates to the synthetic production of hydrocarbons, oxygenated hydrocarbons, and the like by the catalytic reduction of carbon monoxide with hydrogen. More particularly, it is concerned with conducting this reaction through the agency of new and improved catalysts.

It has been previously proposed to cause the interaction of carbon monoxide and hydrogen through the agency of catalysts comprising metals of group 8 of the periodic table particularly metals of the iron group and ruthenium. Of these, cobalt and iron have been most successfully employed. They are characterized by a relatively good selectivity being capable under optimum temperatures and pressures of producing a predominance of hydrocarbons and oxygenated hydrocarbons in relatively narrow predetermined boiling ranges. While, for example, when operating to produce hydrocarbons predominantly in the motor gasoline range, there is an undesirable production of lighter gaseous hydrocarbons as well, nevertheless this undesired product is not excessive in quantity if optimum conditions of reaction are maintained. A tendency, moreover, particularly in the case of the iron catalyst, to consume carbon monoxide in the production of by-product carbon dioxide instead of desired by-product water vapor can also be overcome, to some extent, by proper operation.

It is an object of the present invention to provide a new group of catalysts which, per se, are effective for the catalytic synthesis of hydrocarbons, oxygenated hydrocarbons and the like, and provide an active catalytic medium broadly equivalent to the known catalysts discussed above, and, in some particulars, superior. Another object contemplates a process as above wherein the reaction may be carried out with a reasonably low production of undesired by-products, particularly carbon dioxide and methane. Other objects will be apparent from the following specification and claims.

In accordance with the present invention a fresh feed gas consisting essentially of hydrogen and carbon monoxide advantageously in about combining proportions, is passed in contact, under reaction conditions, including an elevated temperature and preferably although not necessarily, elevated pressure, with a catalyst comprising a nitride of an element selected from the class consisting of titanium, vanadium, chromium, manganese, zirconium, columbium, molybdenum, masurium, hafnium, tantalum, tungsten, rhenium, thorium, protoactinium and uranium.

2

The foregoing class of elements comprises the elements of groups IVA, VA, VIA and VIIA of the Periodic Table. More specifically, these elements include all of the transition elements in which an incompleted subshell or orbit of electrons just within the outer partially completed shell, contain from 2 to 5 electrons inclusive. In view of the many current variations in interpretation, and periodic arrangement of the elements, reference herein to the periodic table is specifically intended to mean Mendeleeff's Periodic Table as set forth on page 411 of the "Text-Book of Inorganic Chemistry" by Partington (fifth edition).

It has been discovered that the said nitrides of the elements in question are active for catalyzing the reaction of carbon monoxide and hydrogen, whereby hydrocarbons and oxygenated hydrocarbons are formed. It has furthermore been discovered that the catalytic action, in general, proceeds, at appropriate temperatures, with the activation of the carbon monoxide to such an extent relative to the activation of the hydrogen as to promote the formation of normally liquid hydrocarbons in preference to normally gaseous hydrocarbons. In short, it appears that the catalysts in question have a general tendency to predominantly activate the carbon monoxide for the production of hydrocarbons while relatively restricting the hydrogenating effect so that polymerization of nascent $CH_2$ units tend to precede the hydrogenation of individual or only partially polymerized $CH_2$ groups which would otherwise result in the formation of material proportions of hydrocarbon gases. Moreover, carbon dioxide production is usually moderate, and in some cases more limited than that characterizing the earlier proposed catalysts. It is to be understood, however, that the foregoing theories are advanced only for the purpose of better illustrating the principles involved and are not intended as a limitation herein.

In any event, the invention has the advantage of providing a process which materially limits the relative production of gaseous hydrocarbons, and tends toward the production of by-product water vapor in place of carbon dioxide, with the resulting conservation of carbon supplied to the process.

The catalysts in question may be employed individually or in combination, or together with other previously proposed catalysts and activators for the present process. In general the catalysts taught by the present invention when used, per se, embody numerous advantages including those mentioned above. On the other hand, in combination with conventional catalysts they may tend, progressively, to modify the usual effects in accordance with their individual characteristics so that quantitatively intermediate results may be achieved. In short, the catalysts of the present invention may be combined with typical iron and cobalt catalysts.

Nitrides of the foregoing metals are readily prepared in accordance with numerous techniques, including particularly the direct nitriding of the metals with nitrogen gas or nitrogen containing compounds, such as ammonia, which are similarly effective at a high temperature. Titanium nitride, zirconium nitride, tungsten nitride, vanadium nitride and molybdenum nitride can be readily formed in this manner. Tungsten nitride can be similarly prepared, as well as by the interaction of tungsten chloride and ammonium chloride vapors in a heated tube. Generally the same remarks apply to the remaining metals of the group involved and all of the products are advantageously employed in the form of a powder or particles of a size appropriate to give the desired surface contact.

Combination catalysts involving, for example, iron or cobalt and the foregoing nitrides may be prepared by nitriding alloys of iron or cobalt with the various transition metals herein disclosed, although any other suitable method of preparation may be employed whereby the nitrides are procured in relatively homogeneous form.

On the other hand the invention is not so limited, but its broadest aspect, and contemplates the use of mixtures of nitride and conventional iron catalysts wherein the respective contact materials are in the form of discrete particles.

In general the reaction in question proceeds at elevated temperatures below 1000° F. considering broadly the entire field of catalysts disclosed. It is to be understood however that the optimum temperature in each case is a characteristic best determined by trial for each specific catalyst. In general it may be stated that, in each case, the optimum range for the production of liquid hydrocarbons boiling in the gasoline range will usually be between 400 and 700° F. and typically at a temperature about intermediate between the two. For example, tungsten nitride is effective as a catalyst at about the range characteristic of the typical iron catalyst for the reaction in question, making it quite suitable as a component of a combination catalyst including the aforementioned catalytic iron. By itself, somewhat higher temperatures may be desirable, for example 650° F. or thereabouts, and broadly in the range of 500 to 750° F. The optimum temperature for uranium nitride is similarly about 650° F. Similar remarks apply to the case of the vanadium or thorium nitride. As, however, in the case of any specific catalyst for the present process, the narrow, truly optimum temperature can only be actually determined by the usual, conventional procedure, namely trial of a test sample.

Pressures are similarly determined, although these do not appear to be highly critical since reaction proceeds generally in the range of atmospheric up to 500 pounds per square inch or higher. Usually the optimum pressures will be somewhat elevated, as for example, 100 to 300 pounds per square inch. Here again the optimum pressure, in common with hitherto known catalysts, will vary not only with the particular catalyst, but in accordance with the specific product desired. Also, by selection of temperature and pressure, some degree of flexibility is available in regard to directing the process toward predominant production of oxygenated hydrocarbons, or hydrocarbons free from oxygen atoms as may be desired. Similarly the selection of appropriate temperatures, in particular results in reaction products of predetermined average molecular weight. That is to say, for instance, higher temperatures than those indicated above usually result in hydrocarbons or oxygenated hydrocarbons of lower molecular weight, while conversely lower temperatures, tend toward products of higher molecular weight.

Contact time is similarly determined, and in most cases is not critical, the reaction going forward rapidly under conditions of good temperature control and under low or high space velocity as may be desired.

The apparatus which may be employed will not be described in detail here for the reason that it may follow the design of any of the typical processing equipment hitherto known and proposed for the catalytic synthesis of hydrocarbons by the reduction of carbon monoxide with hydrogen. One arrangement which has been found suitable involves passing of the reactant gases upwardly through a mass of powdered catalyst maintained in a state of dense phase fluidization thereby, with suitable cooling surfaces immersed in the fluidized mass and maintained at an appropriate temperature such that the catalyst bed has a uniform predetermined temperature throughout corresponding to the desired reaction temperature.

The feed gases may consist of any of the usual compositions for the reaction in question containing essentially hydrogen and carbon monoxide, generally in the ratio of approximately 2:1. On the other hand, the proportioning of the reactants is not critical and may be varied widely insofar as both of the essential reactants are present in the initial feed in an amount sufficient to form the desired products. This means that any other usual components of synthesis gas may be present either as inerts or for their usual additive function, although preferably in minor or limited proportion. Such for instance are methane, carbon dioxide, nitrogen and the like.

In accordance with one specific embodiment submitted in order to illustrate the specific practice of the present invention in greater detail, a mass of tungsten nitride in the form of a powder passing through a 325-mesh screen is placed in a reaction vessel and a reactant gas comprising about 64% hydrogen and about 32% carbon monoxide is passed upwardly therethrough at a linear velocity of about 1.5 feet per second to maintain the carbide in a condition of dense phase fluidization.

Temperature is maintained at 650° F. within the mass of catalyst by suitable cooling surfaces immersed therein, and the effluent gases removed from the upper surface of the fluidized mass of catalyst are cooled to 70° F. and subjected to separation to remove normally liquid products.

The normally liquid products are permitted to gravitate into a water layer and an oil layer. The oil layer, comprising predominantly liquid hydrocarbons boiling in the motor gasoline range, corresponds overall to about 75% of the carbon monoxide converted in the reaction. The gaseous products separated from two liquid layers contain carbon dioxide corresponding to about 5% of the converted carbon monoxide, and gaseous hydrocarbons corresponding to about 12% of the converted carbon monoxide. The other 8% of the converted carbon monoxide goes into oxygenated products.

In another example, otherwise carried out under the same conditions as above, the titanium nitride is substituted by a mass of powdered catalyst consisting of a homogeneous mass of iron and titanium nitride in which the iron is present in about equal quantity with the titanium. In this case the yield of liquid hydrocarbons drops to about 65% based on the converted carbon monoxide and carbon dioxide occurs in the effluent gas in an amount equivalent to about 10% of the converted carbon monoxide.

It is important in carrying out the present invention that the catalyst be introduced into the reaction zone in the form of the compound indicated and to this end it is important to avoid any preliminary treatments which may decompose the metal nitride compound indicated. That is to say the present invention contemplates the avoidance of all hitherto proposed pretreatments with gases other than synthesis gas which would, under the conditions of pretreatment, destroy the nitride with the production of undesired decomposition products. In short, the invention contemplates initiation of the reaction in question either, with a proper synthesis gas containing essentially carbon oxide and hydrogen, or with catalyst pretreatments which do not decompose the catalyst.

It is to be noted that the invention contemplates where desired, use of any conventional promoter or activator such as the alkali or alkaline earth metal oxides and the many others known in the art.

From the foregoing it will be apparent that the present invention provides a new and improved process and catalyst for the formation of hydrocarbons, oxygenated hydrocarbons, and the like by the catalytic reduction of carbon monoxide with hydrogen. While disclosed above essentially in the unsupported state, these catalysts are equally adaptable to embodiment with the conventional carriers, such as diatomaceous earth, filter-cel and the like, and may be deposited and prepared thereon in any conventional manner.

Obviously many modifications and variations of the invention as hereinafter set forth may be made without departing from the spirit and scope thereof, and therefore only such limitations should be imposed as are indicated in the appended claims.

I claim:

1. In a process for the production of liquid hydrocarbons by the interaction of carbon monoxide and hydrogen, the improvement which comprises passing a mixture of hydrogen and carbon monoxide into contact with particles of a nitride of a transition element of the IVA, VA, VIA, and VIIA groups of the Periodic Table at a temperature within the range of 400 to 800° F. and at a pressure within the range of 100 to 300 pounds per square inch.

2. In a process for the production of liquid hydrocarbons by the interaction of carbon monoxide and hydrogen, the improvement which comprises passing a mixture of hydrogen and carbon monoxide into contact with particles of a nitride of a transition element of the IVA, VA, VIA, and VIIA groups of the Periodic Table at a temperature within the range of 550 to 700° F. and at a pressure within the range of 100 to 300 pounds per square inch.

3. A process as defined in claim 1 wherein said nitride is tungsten nitride.

4. A process as defined in claim 1 wherein said nitride is titanium nitride.

WALTER G. FRANKENBURG.

REFERENCES CITED

The following references are of record in the file of this patent:

UNITED STATES PATENTS

| Number | Name | Date |
|---|---|---|
| 1,491,588 | Duparc et al. | Apr. 22, 1924 |
| 1,931,550 | Krauch et al. | Oct. 24, 1933 |
| 2,211,022 | Michael et al. | Aug. 13, 1940 |

FOREIGN PATENTS

| Number | Country | Date |
|---|---|---|
| 564,148 | France | Oct. 15, 1923 |
| 636,682 | Germany | Oct. 15, 1936 |

OTHER REFERENCES

Hodgman et al.: "Handbook of Chemistry and Physics"; 27th Edition 1943 (pages 484 and 485), Chemical Rubber Pub. Co.